July 24, 1923. 1,463,012
J. H. FARRER
APPARATUS FOR THE MANUFACTURE OF HORSESHOES
Filed Jan. 26, 1923  10 Sheets-Sheet 5

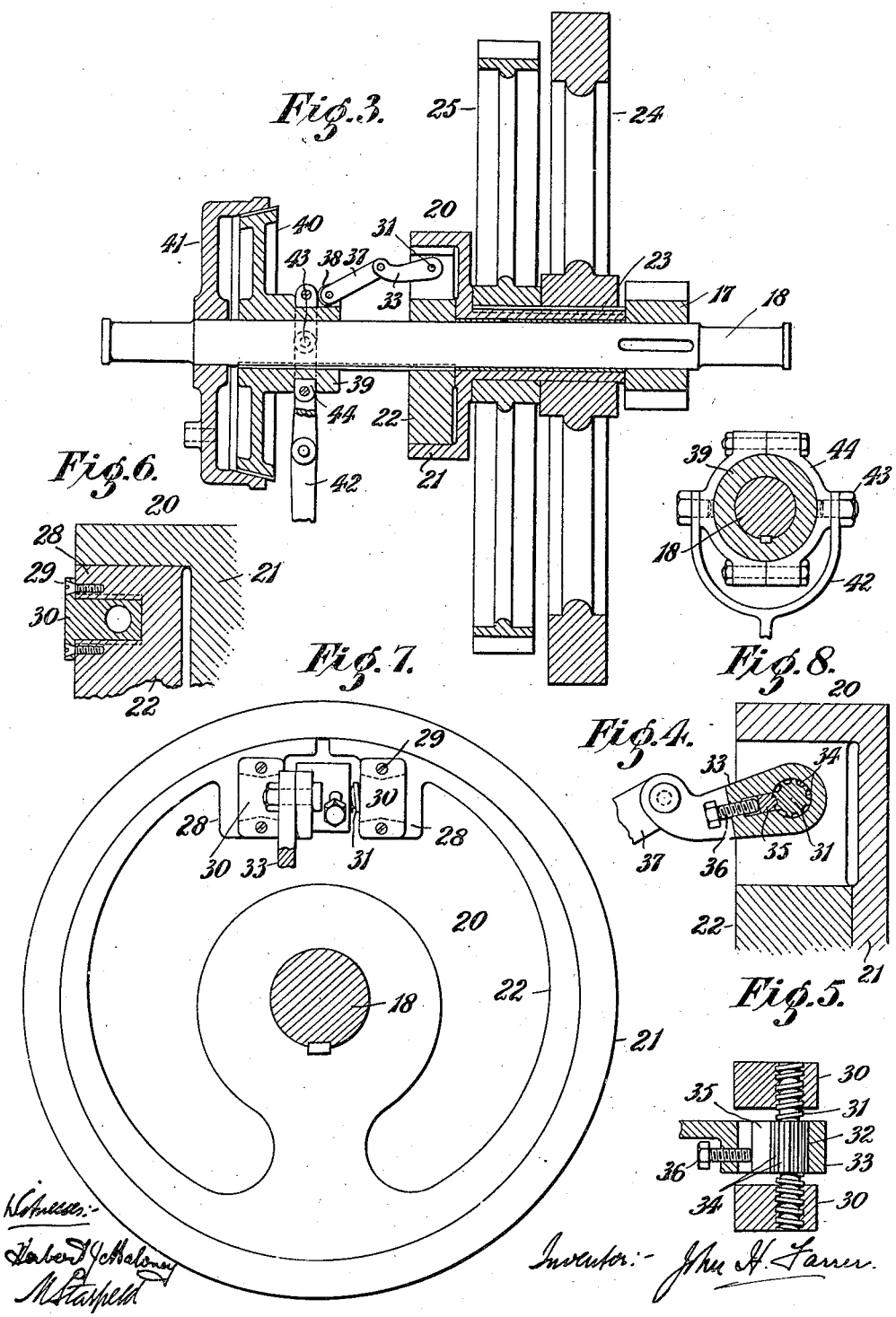

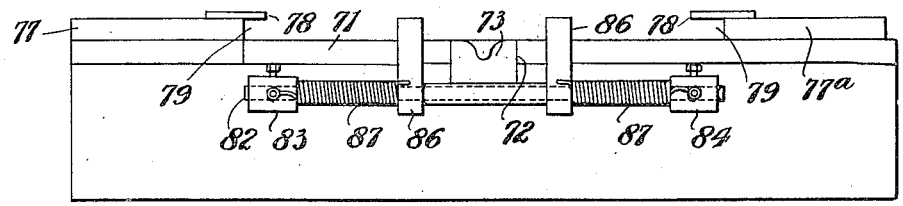
Fig. 15.
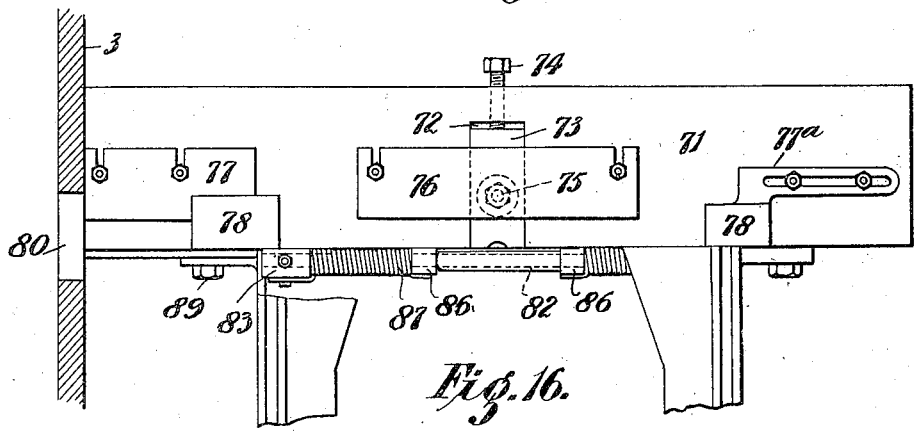
Fig. 16.
Fig. 17.
Fig. 19.
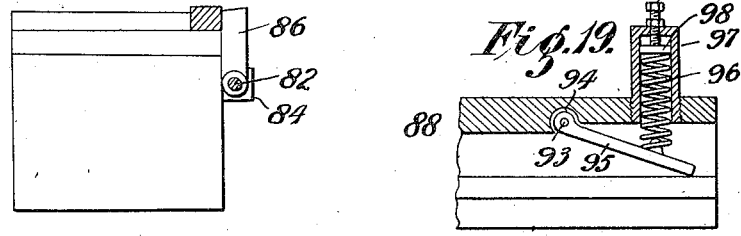
Fig. 18.
Fig. 20.
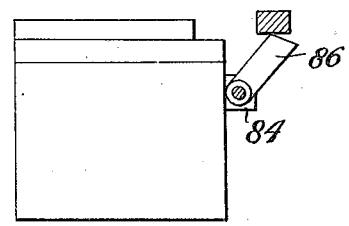
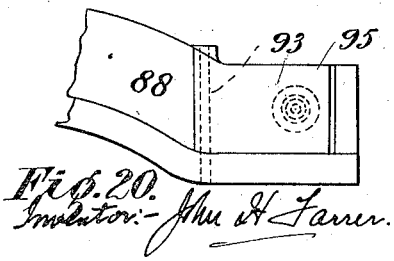

July 24, 1923.

J. H. FARRER 1,463,012

APPARATUS FOR THE MANUFACTURE OF HORSESHOES

Filed Jan. 26, 1923

Witnesses:
Herbert J. Maloney
M. Starfeld

Inventor
John H. Farrer

July 24, 1923.  1,463,012
J. H. FARRER
APPARATUS FOR THE MANUFACTURE OF HORSESHOES
Filed Jan. 26, 1923   10 Sheets-Sheet 9

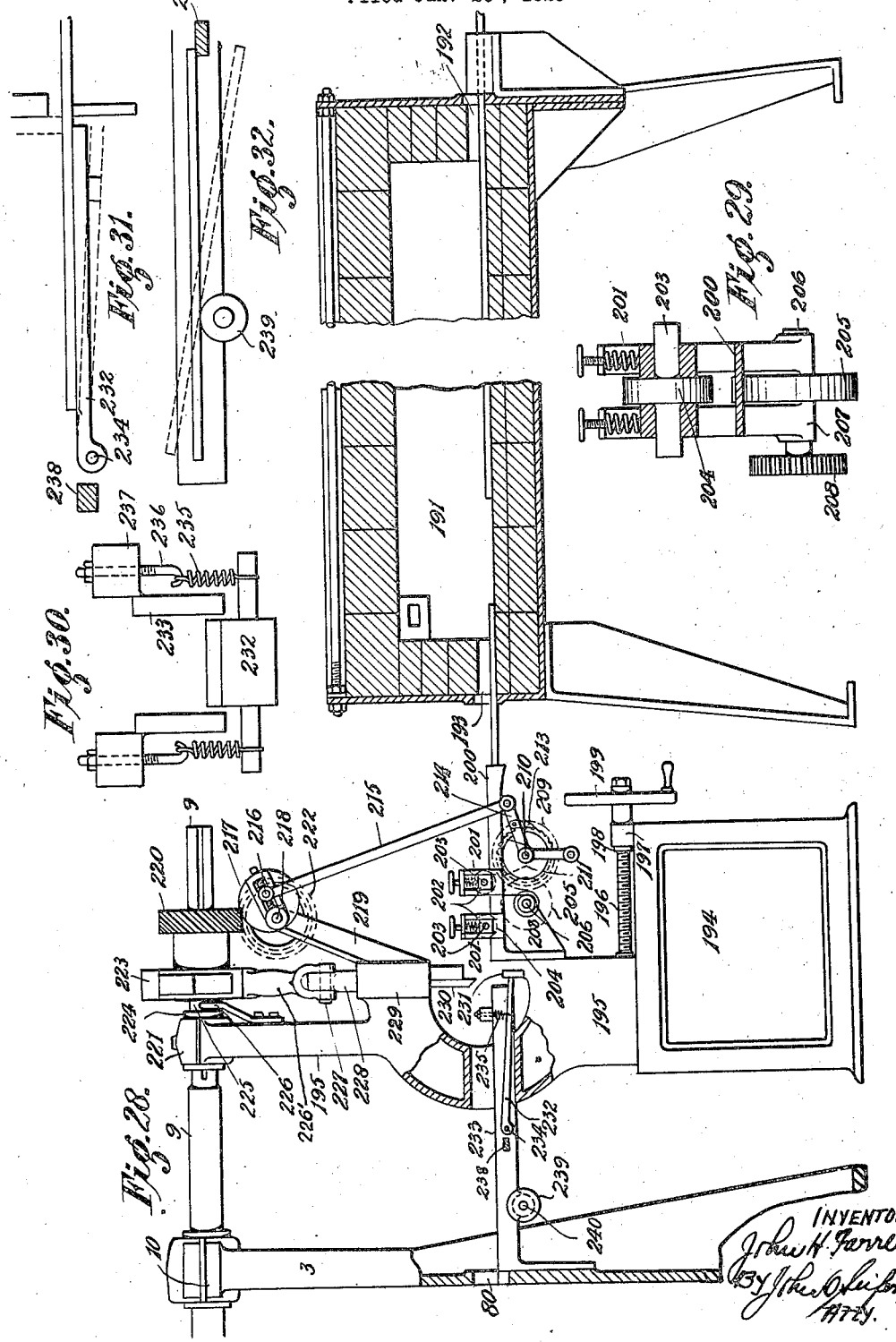

Patented July 24, 1923.

1,463,012

UNITED STATES PATENT OFFICE.

JOHN HANBURY FARRER, OF NEUTRAL BAY, NEAR SYDNEY, NEW SOUTH WALES, AUSTRALIA.

APPARATUS FOR THE MANUFACTURE OF HORSESHOES.

Application filed January 26, 1923. Serial No. 615,133.

*To all whom it may concern:*

Be it known that I, JOHN HANBURY FARRER, a subject of the King of Great Britain, residing at Neutral Bay, near Sydney, in the State of New South Wales, Commonwealth of Australia, have invented new and useful Improvements in Apparatus for the Manufacture of Horseshoes, of which the following is a specification.

This invention relates to an improved apparatus for manufacturing horse-shoes from heated metal bars by a sequence of operations that are performed continuously and automatically.

The improved apparatus provides for forming the clips at the toe portions of the shoes, when the heated bars are in the straight and in sequence with the fullering operation, immediately following the automatic delivery of the horse-shoe blanks from the furnace. The bending, seating and correcting operations are performed by dies and rollers in correct sequence, subsequently to the fullering and toe clipping of the blanks.

Automatic feed and shearing mechanism is associated with a continuous heating furnace, employed to bring long lengths of metal bars to a required temperature for forging purposes, and this mechanism functions to cut the heated bars into blanks of predetermined length and to feed the same continuously to the main manufacturing machine.

Reference being had to the accompanying drawings:—

Figure 3 is a view in sectional elevation illustrating a clutch and brake mounted upon the main driving shaft and adapted to be simultaneously actuated by a control lever.

Figure 4 is a sectional view in detail of the clutch arm.

Figure 5 is a sectional view in plan of portion of the clutch arm.

Figure 6 is a detail sectional view of one of two tapped blocks fitted in the expanding clutch member to support the spindle of the clutch arm.

Figure 7 is a view in front elevation of the expanding clutch member fitted on the main driving shaft and housed in a stationary casing.

Figure 8 is a detail view of the upper portion of the lever operating the clutch and brake simultaneously.

Figure 15 is a view in elevation of portion of the fullering table.

Figure 16 is a view in plan of the fullering table, and illustrating guide brackets secured thereto.

Figure 17 is a detail view illustrating the spring actuated arms that position the heated metal blanks upon the fullering table.

Figure 18 is a similar view to Figure 17, but showing the position of said locating arms when the fullered and clipped metal blanks are being ejected from the fullering table.

Figures 19 and 20 are detail views illustrating a push plate which is mounted upon one of the guide brackets and adapted to deliver the fullered and clipped blank to a position beneath the bending and finishing tools.

Figure 28 is a view in side elevation, partly in section, of a continuous furnace for heating long lengths of metal bars and associated mechanism for cutting the bars into blanks of required length, and feeding the latter to the main machine.

Figures 29, 30, 31 and 32 are detail views on an enlarged scale of parts of the shearing and feeding mechanism seen in Figure 28.

Figure 1:
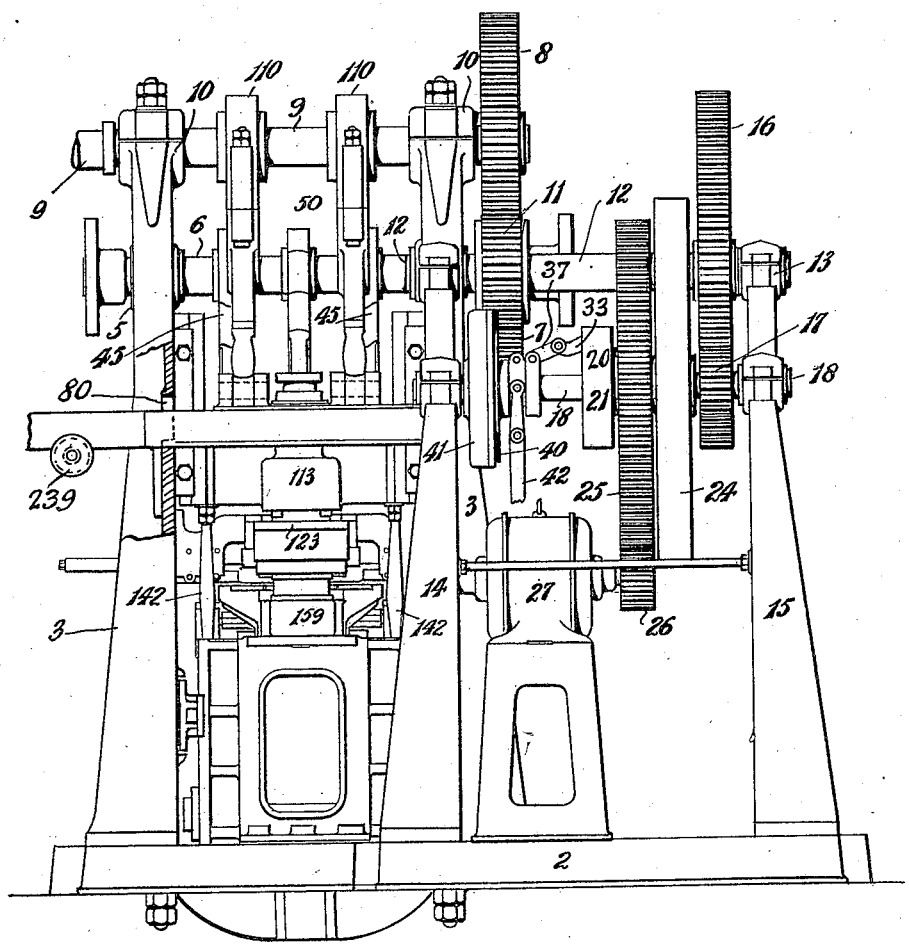
Figure 1 is a view in end elevation of the machine employed for fullering and clipping the heated metal blanks, and for the subsequent performance of the bending, seating and correcting operations.

In these views, 2 designates a cast metal base, upon which is fixedly mounted a pair of vertical frame members 3 rigidly secured together by transverse bolts 4 and furnished at their upper ends with bearings 5 wherein is revolvably mounted an eccentric shaft 6.

A spur-wheel 7 is fixedly mounted upon the eccentric shaft 6 and meshes with a similar spur-wheel 8 immovably fitted upon a second eccentric shaft 9 (hereinafter referred to as the eccentric pressure shaft) revolvably supported in bearings 10 carried by the vertical frame members 3. The spur-wheel 8 on the eccentric pressure shaft 9 is also in mesh with a pinion 11 located on an intermediate shaft 12, revolvably mounted in bearings 13 formed on, or secured to, metal standards 14 and 15 affixed to the machine base 2.

A spur-wheel 16 is mounted upon the intermediate shaft 12, and it meshes with a spur pinion 17 fitted on the main driving shaft 18 of the machine, which is revolvable in bearings 19 secured to the lower stepped portion of the standards 14 and 15.

The operative mechanism of the apparatus is connected to and disconnected from the driving shaft 18, by an expanding clutch 20, Figure 3. This clutch comprises a casing 21 which is loosely mounted upon said main driving shaft and functions as the housing for the expanding clutch member 22, which is fitted on the main driving shaft by a key or like fastening means.

The clutch casing 21 is constructed having a sleeve extension 23 loosely surrounding said main driving shaft. Fixedly mounted upon said sleeve extension is a fly-wheel 24 and a spur wheel 25, the latter meshing with a pinion 26 keyed on the end of the spindle of an electric motor 27 driving the machine.

The expanding clutch member 22 fitted upon the main driving shaft so as to be revolvable therewith is snugly housed in the clutch casing 21, while said clutch member is furnished at its expanding end portions with apertured lugs 28, in each of which is detachably secured, by studs 29, a tapped block 30 (Figures 6 and 7). One of these blocks is tapped with a right-hand thread, and the opposing block is tapped with a left-hand thread, (Figure 5) so as to receive the right and the left-hand screw-threaded ends of a short rod 31, which is furnished at its central portion 32 with a clutch-operating arm 33. This arm is rotatably adjustable upon the rod 31, for which purpose the central and non-threaded portion 32 of said rod has a series of longitudinal grooves 34 circumferentially disposed about the periphery to receive a toothed key 35. This key is slidably fitted in the boss of said arm 33 and is adapted to be locked in engagement with a selected groove 34 by means of a set-screw 36, the latter screwing into the boss of said arm. The outer end of the clutch operating arm 33 is pivotally attached by a link 37 to a lug 38 formed on a boss 39 formed on a movable cone-shaped brake member 40 of the friction type, which is longitudinally slidable upon, but rotatable with, the driving shaft 18 of the machine. This movable brake member 40 is capable of being placed into or out of frictional engagement with a stationary brake cylinder 41—mounted upon said main driving shaft—by means of a pivoted forked lever 42 having its bifurcated end pivotally attached by studs 43 to a split clamp ring 44 loosely fitted in a circumferential groove formed in the boss 39 of said movable brake member 40.

The forked lever 42 by reason of the pivotal link connection between the movable brake member 40 and the expanding clutch 22, functions also as a clutch operating lever, and it is actuated by a pedal lever (not shown) whereby the said expanding clutch 22 and the movable brake member 40 are thrown alternately into and out of action for the purpose of starting and stopping the machine. The clutch operating arm 33 is revolvably adjusted upon the grooved rod 31 by means of the toothed key 35 in order that the position of said clutch arm can be set at a required angle to regulate the movement of the expansible clutch member 22 by the rotation of said screw-threaded rod and also to appropriately regulate the sliding movement of the movable brake member 40, according to the brake power that is required for stopping and starting the machine.

A pair of eccentrics 45 are mounted upon the eccentric shaft 6 and their rods 46 are pivotally attached at their lower ends to gudgeon pins 47 mounted in a fullering cross-head 48, which is vertically slidable in guides 49 located on the side members 3 of the machine frame.

Also mounted upon the eccentric shaft 6, at a central position between the pair of eccentrics 45 thereon, is another eccentric 50, the throw of which is slightly greater than the throw of the pair of eccentrics beforementioned. This centrally disposed eccentric is so positioned upon the shaft 6 that its lower dead centre follows at a later period than the lower dead centre of the eccentrics 45. The rod 51 of the eccentric 50 is pivotally attached at its lower end to a pin 52 mounted in a clipping slide 53, which is vertically movable in a guide member 54 formed centrally in the fullering cross-head 48, and having at its lower end a recess 55 wherein a bending tool 56 is detachably fixed by bolts 57 (Figure 14).

Figure 2:
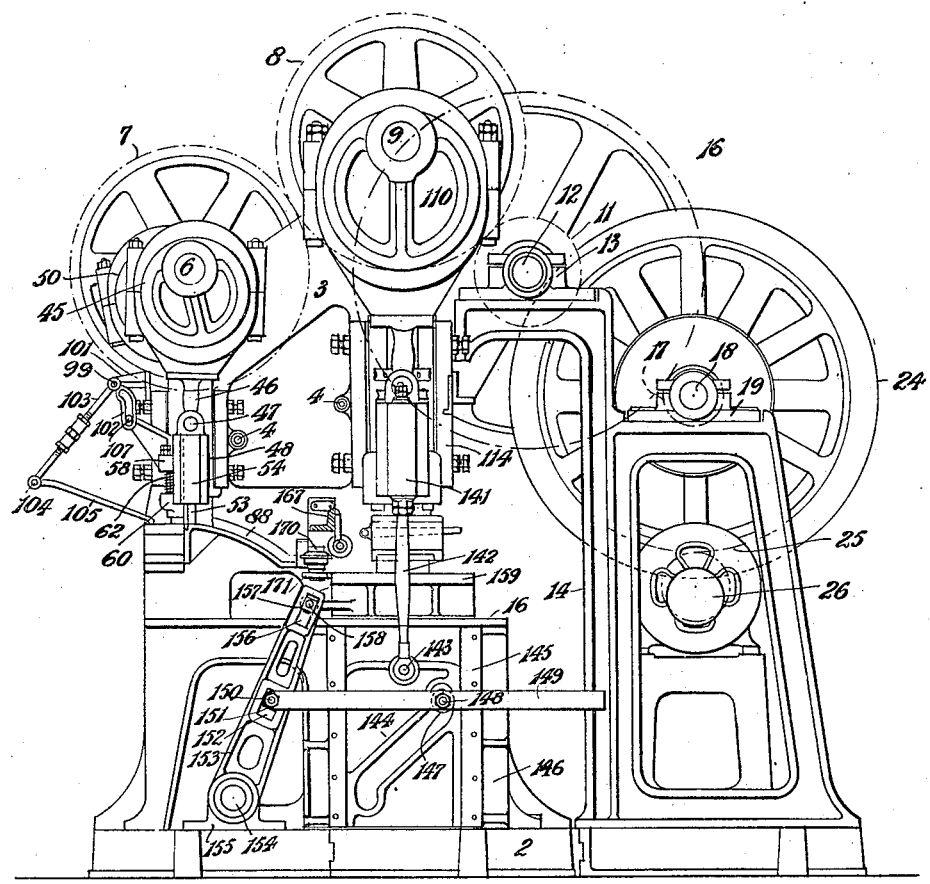
Figure 2 is a view in side elevation of the machine, having one of its side frames removed for convenience of illustration.
Figure 9:
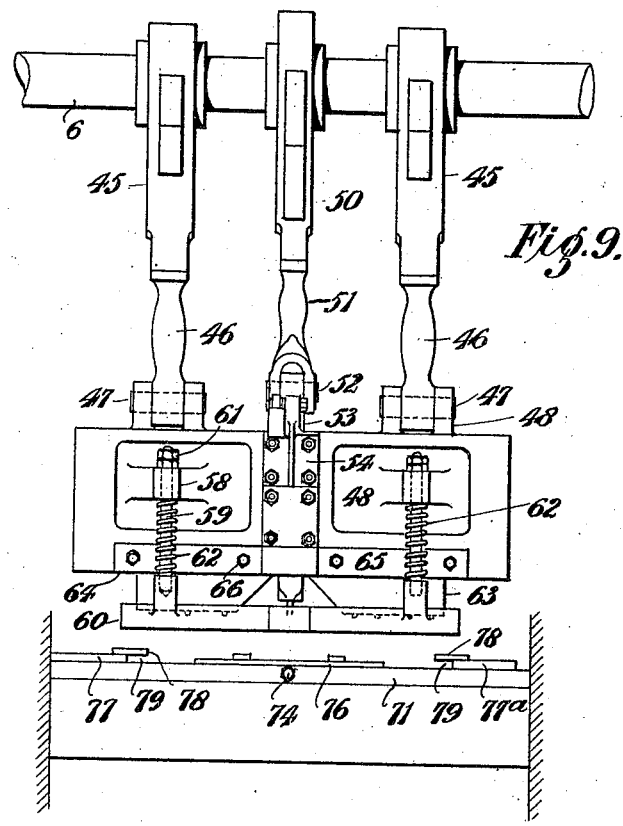
Figure 9 is a view in front elevation illustrating the fullering and clipping mechanism.
Figures 10, 11:
Figures 10 and 11 are detail sectional views, illustrating the operation of the clipping mechanism.
Figure 12:
Figures 12 and 13 illustrate in side view and in plan a heated metal blank after the same has been clipped and fullered.
Figure 13:
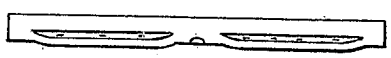

Apertured lugs 58—see Figures 2 and 9—formed on the fullering cross-head 48 serve as guides for the adjustable vertical rods 59 of a vise jaw 60 adapted to hold the metal blank in position upon the fullering table. This vise jaw is adjustable by nuts 61 fitted to the screw-threaded ends of the rods 59. Coiled springs 62 encircle these rods 59 between the vise jaw 60 and the apertured lugs 58 and exert sufficient downward pressure upon said jaw to maintain the metal blank in position during the fullering and clipping operation.

A pair of fullering tools 63 are held rigidly between lugs 64 on the fullering cross-head 48 and a clamping plate 65 that is secured to said cross-head by means of studs 66.

Figure 14:
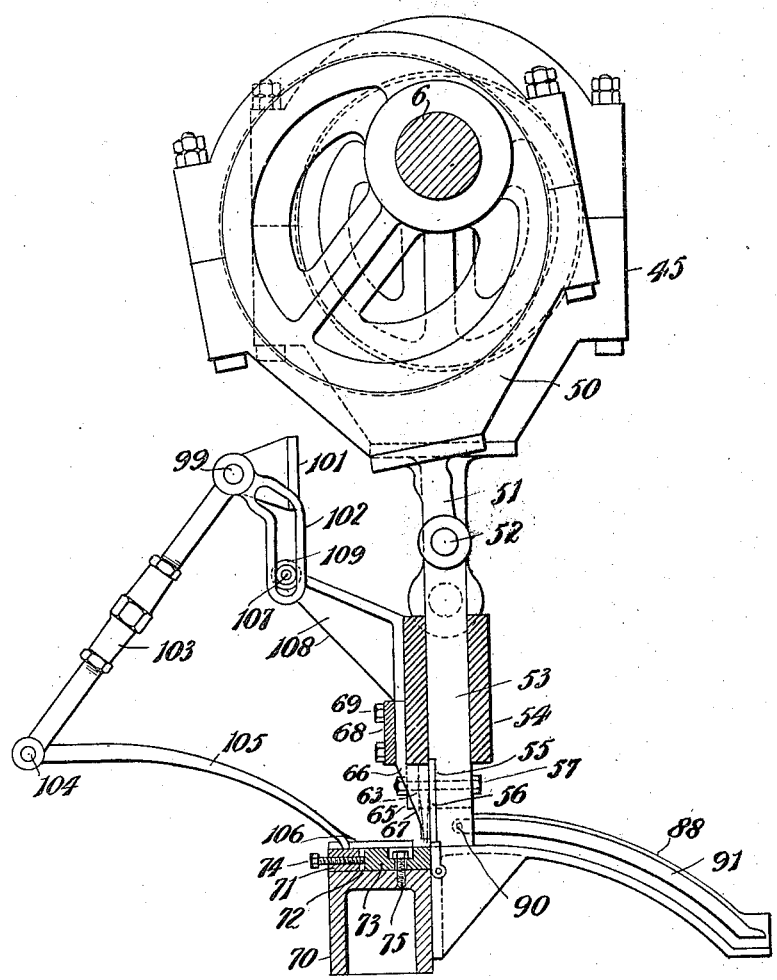
Figure 14 is a view in elevation, partly in section, of the fullering head and table, and associated clipping and feeding mechanism.
Figure 21:
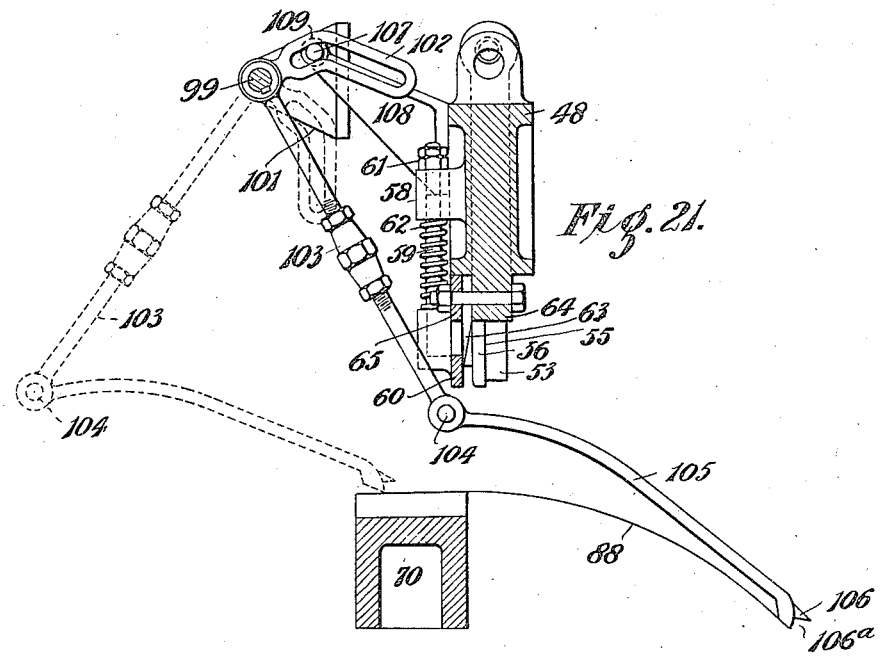
Figure 21 is an elevation partly in section of mechanism for feeding the fullered and clipped blanks from the fullering table to the bending and finishing tools.
Figure 22:
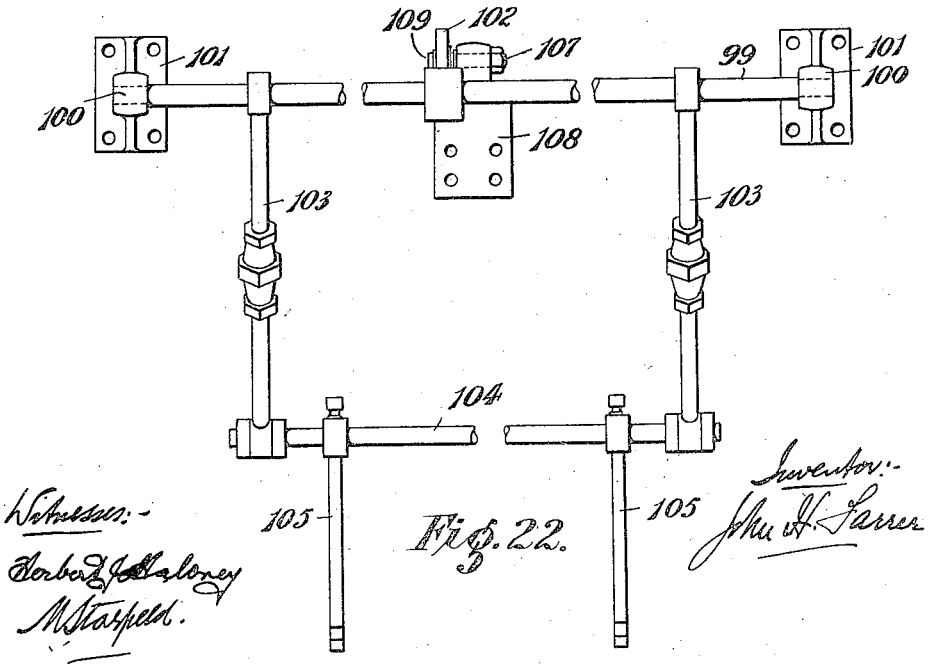
Figure 22 is a view in front elevation of a portion of the feed mechanism seen in Figure 21.
Figure 23:
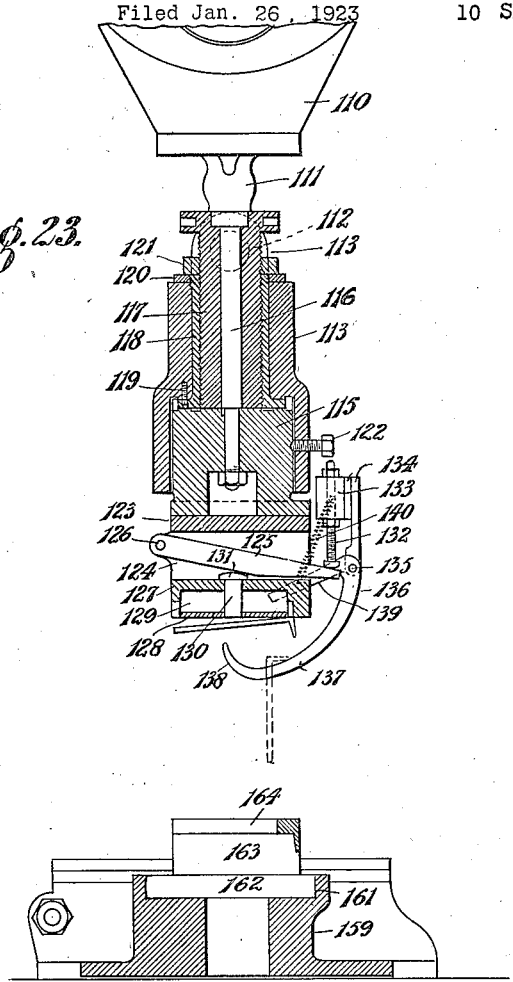
Figure 23 is a view in sectional elevation illustrating the pressure-head carrying an upper die and ejector mechanism, and further illustrates a slide table supporting the lower die employed in the shoe bending and finishing operations.
Figure 24:
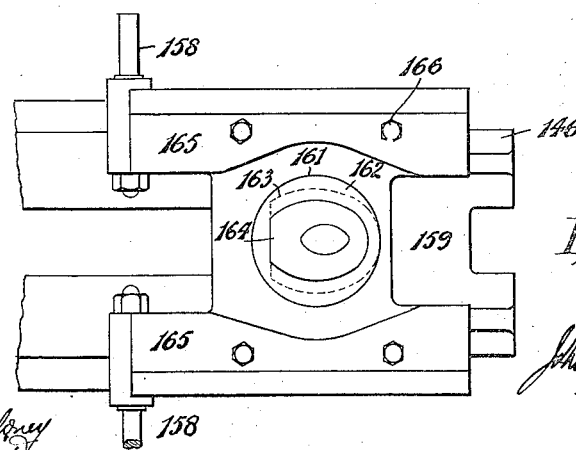
Figure 24 is a view in plan of the slide table carrying the bending and lower finishing die.

A spreading tool 67 is fitted flush against the bending tool 56 and is detachably secured in position to the fullering cross-head by a clamp plate and studs 69—see Figure 14.

A fullering table 70 is disposed beneath the fullering cross-head 48 and rigidly bolted between the side frame members 3. A wearing plate 71 secured to the upper surface of said fullering table has a central recess 72, wherein is mounted a clipping die-block 73 that is adjusted by a set-screw 74 to provide for variations in the thicknesses of clips to be formed on the heated metal blanks, and then locked in a set position by a stud 75.

An adjustable locating plate 76 is mounted centrally upon the wearing plate 71, which also supports an adjustable guide member 77 and a stop 77ª, each having a lug 78 to form a guide 79. This locating plate 76 and the stop 77ª function to correctly locate and guide the heated metal blanks, as they pass through the feed opening 80 in the machine frame (Figure 16), onto the wearing plate 71 directly beneath the fullering cross-head 48 to be fullered and clipped.

The heated metal blanks after being fullered and clipped are discharged from the table 70 by feed arms, while the lugs 78 on the guide member 77 and the stop 77ª prevent said blanks being overturned or otherwise displaced during the return stroke of said feed arms.

Pivotally mounted upon a rod 82 supported in bearings 83 and 84 on the interior surface of the fullering table 70 are links 86 which are maintained in close contact with the wearing plate 71 of the fullering table by springs 87 encircling said rod 82. The purpose of these links is to maintain the metal blanks against the adjustable guide plate 76 in correct position when being fed to the machine.

Guide brackets 88 are secured to the interior surface of the fullering table by means of bolts 89 to accommodate varying lengths of metal blanks. Pivotally mounted upon pins 90 are curved links 91 which act as brake members to retard the movement of the metal blanks as the feed arms 81 force the same down the guide brackets 88 leading from the fullering table 70 to a desired position relative to the bending or forging rollers 170.

Pivotally supported upon a pin 93 secured to the lower end portion of one of the guide brackets 88 and seated in a recess 94 formed therein is a spring actuated push-plate 95, which provides for any very slight variations that may exist in the lengths of the metal blanks from which the horseshoes are to be formed. The push-plate 95 is actuated by a coiled spring 96 which is mounted in a cylinder 97 secured to the bracket 88, and the tension of which can be regulated by the set-screw 97ª and bearing plate 98. Said push-plate is adapted to direct the fullered and clipped bar into its correct position centrally between and against said forging rollers 92.

A rocker shaft 99 is revolvably mounted in brackets 101 secured to the machine frame. Fixedly mounted upon said rocker shaft is a slotted oscillating cam 102 and a pair of rods 103 which are adjustable in length and have their lower ends pivotally attached to a horizontal rod 104. Pivotally mounted upon this rod 104 is a pair of feed arms 105 having their lower free ends bearing upon the wearing plate 71 attached to the fullering table 70 and furnished with projection lugs 106, between which is formed a recess 106ª to engage the heated metal blanks and prevent them from jumping out of position as they pass down the guide brackets 88 beforementioned. Mounted upon pins 107 secured in brackets 108 attached to the fullering cross-head 48 are anti-friction rollers 109 revolvably accommodated in slotted cams 102 fitted on the rocker shaft 99.

The vertical reciprocating movement of the fullering cross-head causes a rocking movement to be imparted to the shaft 99. The slotted cams 102 engaged by the rollers 109 are so designed that they pause until such time as said cross-head with the attached clipping or bending slide 53 rises clear of the fullering table 70 and permits the feed arms 105 (contacting with the fullered and clipped blank) to be advanced down the guide brackets 88 under the curved links 91 to a position enabling the blank to be caught by the forging rollers 170 for the performance of subsequent bending and shaping operations.

Mounted upon the pressure eccentric shaft 9 are two eccentrics 110 having their lower ends pivotally attached by a pin 112 to a reciprocating ram or cross-head 113 that is vertically slidable in guides 114 secured to the machine frame.

Adjustably fitted in the cross-head 113 is a ram block 115, which is detachably secured by a central vertical bolt 116 to the lower end of a vertically adjustable sleeve 117 screwed into a tapped liner 118 that is fitted in said cross-head 113 and locked therein by set-screws 119 and a lock-nut 120, while the screw-threaded sleeve 117 is locked in its set adjusted position by a lock-nut 121 and set screw 122.

An ejector block 123 is located at the lower surface of the ram block 115, and it is constructed with a recess 124 to accommodate an ejector lever 125 pivotally mounted upon a pin 126 secured in said ejector block.

An enclosing upper die 127 is fitted to the lower surface of said ejector block and it is furnished with a slidable ejector plate 128. This ejector plate, which is vertically slidable in a recess 129 formed in said upper die and is constructed with a pin 130 having an enlarged head 131, is adapted to eject the finished horse-shoe from the upper die 127 after each finishing-off operation.

The ejector lever 125 bears upon the enlarged head portion of the ejector plate pin 130 and is actuated by means of a screw-threaded tappet rod 132, which is adjustably mounted in a boss 133 attached to a bracket 134 secured to the machine frame.

A pin 135 carried by the bracket 134 pivotally supports a bell-crank lever 136, the long arm 137 of which has a hook-shaped end 138. The opposite or short arm 139 of said bell-crank lever is connected by a spring 140 to the lug 133 supporting the adjustable tappet rod 132.

When the reciprocating ram or cross-head 113 has been raised to the limit of its upward stroke, after the finishing operation, the ejector lever 125 contacts with the tappet rod 132 and forces the ejector plate 128 downwards clear of the recess 129, thereby ejecting the finished horse-shoe from the upper die so as to permit it to descend by gravity directly onto the hooked end 138 of the bell-crank lever 136.

The reciprocating ram or cross-head 113 on its return or downward stroke contacts with the short arm 139 of said bell-crank lever and forces the same downwardly against the tension of the spring 140, thereby causing said hooked end, which now supports the horse-shoe, to swing from under the die to a position that allows the horseshoe to descend by gravity into a suitable receptacle (not shown) for removal from the machine for the final operation of punching the nail holes.

Fixedly attached to lugs 141 formed on the ram or cross-head 113 are connecting rods 142 having their lower ends pivotally connected by pins 143 to vertically arranged reciprocating cams 144 slidably mounted in guides 145 secured to the machine base and disposed one at either side of a slide table 146 secured to the base plate 2 of the machine.

Accommodated in the profile of each cam 144 is a roller 147, which is revolvably supported upon a pin bolt 148 secured to a horizontally disposed draw-bar 149 slidably mounted in guides (not shown) secured to the interior surfaces of the side frames 3. One end of each draw-bar is pivotally attached to a pin 150 fitted in a block 151 that is slidable in a slot 152 formed in a rocker arm or lever 153 which is mounted upon a rocker shaft 154 supported in bearings 155 secured to the machine base.

The upper end of each rocker lever or arm 153 has a slot 156 wherein is slidably mounted a block bearing 157 to receive a pin 158 secured to a charger table 159 that is horizontally slidable in guides 160 secured to the upper surface of the slide table 146.

The vertical reciprocating cams 144 are so designed that they pause at the end of each stroke of the ram or cross-head 113 in order to maintain the draw-bars 149 and the sliding charger table 159 stationary for a predetermined period during the performance of the final finishing operation upon the fullered, clipped and shaped horse-shoe blank.

A recess 161 is formed in the upper surface of the charger table 159 wherein is removably fitted a base member 162 detachably supporting a bottom die 163 upon the upper surface of which is formed a raised "frog" 164. This frog is of the same configuration as the inner outline of the horse-shoe to be manufactured while the lower face portion of the die 163 is shaped to conform to the outer outline of the horse-shoe.

Former die plates 165 are attached to the upper surface of the charger table 159, by set-screws 166, one at either side of the base member 162 of the bottom die 163, and said die plates are so secured as to permit them to be adjusted laterally.

A bracket 167 having end guides 168 is affixed between the vertical frames 3, and slidable in said guides are arms 169 which extend over the path of travel of the charger table.

Revolvably mounted upon the inwardly projecting portion of each of said arms 169 is a forging roller 170 and a "former" roller 171.

Each forging roller is constructed with a slightly tapered surface 172 designed so as to prevent the forging pressure that is exerted on the horse-shoe blanks from unduly squeezing the same such as might close the initially formed fullering grooves. The forging rollers are adapted to contact with the metal blanks to be bent and shaped as they are fed to and lie in a position between said rollers and the raised "frog" 164 of the bottom die 163, whilst the "former" rollers 171 engage with the die plates 165 surrounding said die.

Secured to the outer end of each slide arm 169 supporting a forging roller is a hook 173 to which is attached one end of a tension spring 174 having its opposite end anchored to a hook bolt 175 having adjustment nuts 176 and secured to a bracket 177 affixed to the machine frame—the purpose of said springs being to maintain the "former" rollers 171 in engagement with the die plates 165 by resilient pressure.

Figure 25:
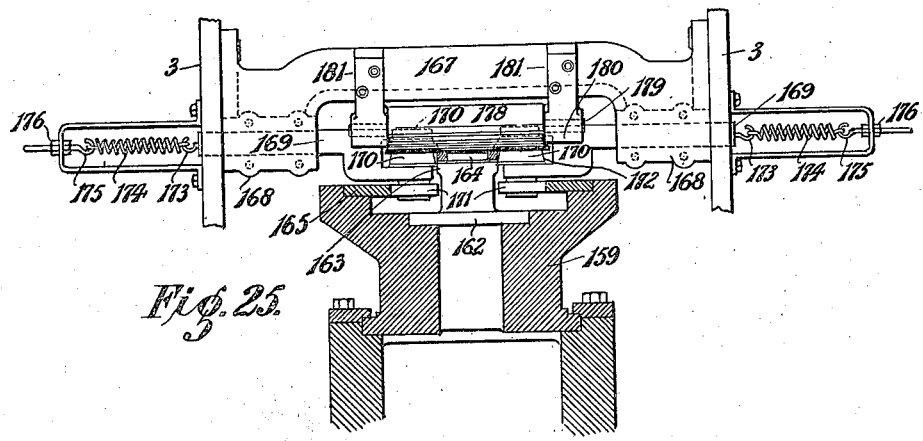
Figure 25 is a view in front elevation, partly in section, of the slide table supporting the lower die and showing the position of co-acting bending and forging rollers.
Figure 26:
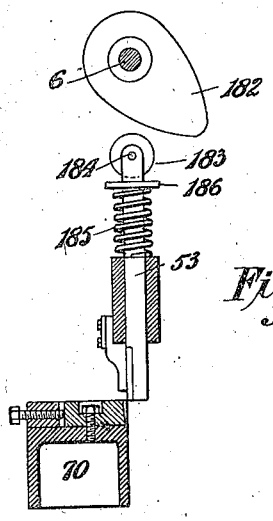
Figure 26 is a detail view in section of a modified means for operating the clipping mechanism.
Figure 27:
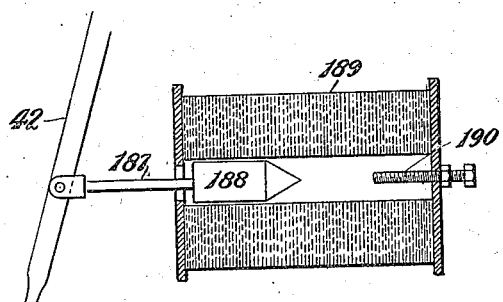
Figure 27 is a view in detail illustrating an automatic cut-off mechanism to stop the machine should it be over-loaded.

A horizontal roller 178 is provided to prevent the toe portion of the partially completed horse-shoe from lifting-off the die whilst the heel portions are being correctly formed or shaped. This roller is mounted above said die and is furnished with pintles 179 which are revolvably mounted in bearings 180 formed in brackets 181 secured to the main guide bracket 167—see Figure 25.

According to the modified means for operating the clipping tools as illustrated in Figure 1, a cam 182 is fitted onto the eccentric shaft 6 and is so designed as to contact at the correct period with a roller 183 revolvably mounted upon a pin 184 secured to the clipping slide 53. A coiled spring 185 which encircles the slide 53 between a collar 186 thereon and the upper portion of the fullering cross-head 48 causes a rapid return or upward movement to be imparted to said slide 53 after each clipping operation.

In order to provide an automatically functioning cut-off means for stopping the machine should the same be overloaded, there is provided a rod 187 which is pivotally attached at one end to the lower end portion of the combined clutch and brake operating lever 42. The opposite end of this rod is attached to a plunger or solenoid core 188 slidably mounted in a solenoid 189 and adapted to contact with a contact plug or screw 190 which is electrically connected to an automatic circuit breaker (not shown) installed in the wires or leads connecting the electric motor in such a manner that when the circuit breaker trips or cuts out the motor circuit due to overloading of the motor, the electro-magnet is energized thereby drawing the plunger 188 forward and causing the clutch and brake operating lever that is connected to said plunger by the rod 187 to be operated, simultaneously throwing the clutch out of gear and applying the brake to stop the machine.

Standard metal bars are employed in the manufacture of horse-shoes by the use of the present invention, and these bars are heated prior to being cut into blanks of predetermined length. The heated blanks are fed automatically and continuously to the forging machine for the performance sequentially of the fullering and clipping, bending, shaping and finishing operations hereinbefore outlined.

Referring to Figure 28 of the drawings, 191 indicates a continuous heating furnace having at one end an opening 192 through which the long lengths of merchant bars are fed while a discharge opening 193 is formed in its opposite end. The long lengths of heated bars as they are discharged from the furnace are fed successively to a shearing apparatus. This shearing apparatus comprises a stationary pedestal 194, supporting a metal frame 195 which is slidably adjusted thereon by a screw-threaded rod 196 having one end in engagement with a stationary nut (not shown) fitted to said frame, while its other end is revolvably supported in a bearing 197 secured to the pedestal 194 and is furnished with a thrust collar 198 and a hand-operating wheel 199.

By rotating said hand-wheel, the position of the frame 195 upon the pedestal 194 can be adjusted with nicety, according to the length of the blanks that is required. These blanks are severed from the long lengths of heated bars delivered from the furnace and are fed continuously and automatically to the fullering and clipping mechanism of the forging machine.

Secured to the adjustable frame 195 is a feed-table 200 of trough formation which is disposed directly opposite and in alignment with the discharge opening 193 in the furnace 191. Slotted brackets 201 are located on each side of the table 200 and slidably accommodate spring-actuated adjustable bearings 202, wherein are revolvably supported the spindles 203 of a pair of grip rollers 204. Positioned below the table 200 centrally between said grip rollers is a feed roller 205 having its spindle 206 revolvably supported in bearings 207 secured to the underside of said table. This feed roller 205 co-acts with the rollers 204, firmly gripping the ends of heated bars and withdrawing them from the furnace preparatory to delivering said bars beneath a shearing appliance hereinafter described.

A gear pinion 208 is mounted upon the spindle 206 of the feed roller and meshes with a gear wheel 209 fitted on a short shaft 210 revolvably supported by bracket bearings 211 depending from the table 200.

Also fitted to the short shaft 210 is a ratchet wheel having its teeth successively engaged by a pawl 213 supported on an arm 214. This arm is pivotally mounted at one end on the shaft 210 and has its opposite end pivotally attached by means of a connecting rod 215 to a pin 216. This pin is adjustable in a crank disc 217 which is fitted onto a worm-wheel shaft 218, revolvably supported in a bracket bearing 219 on the adjustable frame 195.

Motion is transmitted to the feed roller 205 by a worm or helical wheel 220 slidably mounted upon, but rotatable with, the pressure eccentric shaft 9 which is slidably mounted in a bearing 221 formed on the upper end of the adjustable frame 195. Said helical or worm wheel 220 is in mesh with a worm-wheel 222 that is mounted upon said worm wheel shaft 218.

An eccentric 223 is slidably mounted upon, but is rotatable with, the overhanging portion of the pressure eccentric shaft 9, and it is constructed with an extension 224 wherein is formed a circumferential groove 225. This groove accommodates the bifurcated end of a bracket 226 secured to the frame 195, the function of said bracket being to constantly maintain the eccentric 223 in correct operative position notwithstanding that said frame 195 has been adjusted in position.

The rod 226' of the eccentric 223 is pivotally attached at its lower end to a pin 227 fitted in the upper end of a vertically reciprocating ram 228 which is slidable in a guide 229 formed on the adjustable frame 195 and detachably supports a shearing blade 230. During the downward stroke of the ram 228, the inner face of said shearing blade contacts with the outer face of a stationary blade 231 that is secured to said adjustable frame 195.

The shearing blades 230 and 231 operate to cut the long lengths of heated metal bars as they pass from the heating furnace into blanks of required lengths for the manufacture of horse-shoes of particular sizes.

These heated metal blanks fall onto a hinged plate 232 that acts as a second bottom for a stationary trough 233 which is affixed to a frame 3 of the horse-shoe machine in alined and spaced relation to the end of the trough 200. This bottom plate 232 is hingedly supported at one end by a pin 234, while its opposite end is resiliently supported by springs 235 that are anchored to bolts 236, adjustably fitted in lugs 237 carried by the side walls of said trough table 233.

The purpose of the springs 235 is to permit the bottom plate 232 to descend to provide clearance for the shearing blade 230 when a horse-shoe blank has been severed from the heated metal bar advanced to the shearing appliance. The forward end of the heated metal blank during the shearing operation is supported by a transverse bearer bar 238 adjustably mounted in the trough 233. The horse-shoe blanks as they are severed from the heated bars are delivered on a roller 239 which is revolvably mounted in said trough upon a short spindle 240. This roller 239 is positioned centrally between the pivotal end of the bottom plate 232 and the machine framing 3, while the distance between said frame and the pivoted bottom plate is slightly less than the length of a metal blank.

In consequence of this arrangement, it will be understood that in the event of a blank of less length than that required to correctly produce a horseshoe or a waste end of a heated metal bar being delivered onto the roller 239, it will overbalance thereon and be automatically discharged through the open space of the trough 233 and between the pivoted end of the bottom plate 232.

The operation of the gripping and feed rollers and of the shearing mechanism hereinbefore described is so timed as to synchronize with the operations of the horse-shoe manufacturing machine.

The modus operandi and the sequential operations of the automatic forging machine are as follows:—

The pivoted forked lever 42 is moved to the right causing the cone-shaped brake member 40 to engage with the brake cylinder 41, simultaneously releasing the expanding clutch member 22 from the clutch casing 21.

Upon the electric motor 27 being started, continuous rotary motion is transmitted through the pinion 26 and spur wheel 25 to the fly-wheel 24 and clutch casing 21. Said forked lever 42 is then moved to its opposite position, thereby imparting horizontal movement to the brake member 40 along the driving shaft 18. This action effects disengagement of the brake member 40 from the cylinder 41, and expands the clutch member 20 against the interior surface of the clutch casing 21 through the operation of the clutch lever 33 on the right and the left-hand screw-threaded rod 31, whereby continuous rotary motion is imparted to the main driving shaft 18. It will be readily understood that the main driving shaft 18 and the eccentric pressure shaft 9 are driven at the same speed, and the machine is both started and stopped by the operation of the one control lever 42.

Long lengths of metal bars of required section are heated to correct forging temperature in the furnace 191 and delivered to the blades 230 and 231 of the shearing mechanism to be cut when in a heated condition into blanks of predetermined length. The severed blanks are now fed automatically and continuously by the feed rollers 204 and 205, co-acting with the shearing mechanism, through the feed opening 80 of the frame of the forging machine. This feeding mechanism is so timed that the heated blanks are fed onto the fullering table 70 in advance of the feed arms 105 and between the guide members 77 and the stop 77ª when the fullering cross-head 48 is at the end of its upward stroke.

The fullering cross-head 48 in its descent, acting through the slotted cams 102 and rods 103 on the rocker-shaft 99, causes the feed arms 105 to be returned up the guide brackets 88—passing over the heated blank— to their normal operative position on the fullering table 70, and to remain stationary in such position for a predetermined period.

The cross-head 48 is operated by the eccentrics 45, and it carries the fullering tools 63 and the spreading tool 67. In the continued descent of the cross-head, the movable vise jaw 60 is caused to engage with the heated blank and firmly maintain it in position whilst the fullering grooves are impressed in its upper surface by said tools 63 and a lip is simultaneously formed centrally in its forward portion by said spreading tool 67. At the moment of completion of the downward stroke of said cross-head, the vertical slide 53 which is operated by the eccentric 50 and carries the bending tool 56, continues its downward stroke. This tool 56 contacts with the said lip formed on the heated blank, and draws it into the die-block 73, thereby completing the clip-forming operation.

When the cross-head 48 and slide 53, on their return upward stroke, are raised clear of the wearing plate 71 on the fullering table 70, the cams 102 cause the feed arms 105 to move forwardly and their recessed portions 106ª to engage with the fullered and clipped blank, which upon the further movement of said arms is guided down the brackets 88 under the pivoted curved links 91 to the bending and forging rollers 170.

The charger table 159, slidably mounted on the table 146, is operated by eccentrics 110 through the vertical cams 144 and the draw-bars 149 and is moved from beneath the upper enclosing or finishing die 127 carried by the vertically reciprocating ram 113 to its charging position to receive the fullered and clipped metal blank delivered from the fullering table 70. The charger table dwells momentarily in this position to permit the blank being correctly located between the bottom die 163 on said table and the forging rollers 170. Synchronously with the described movement of the charger table, the ram 113 makes its upward return stroke.

The downward stroke of said ram 113 causes the forward or return movement to be imparted to the charger table whereon the fullered and clipped blank is supported. In this movement, the "frog" 164, contacting with the blank, forces it between the forging rollers 170 which correctly bends it about the frog by reason of the engagement of the two "former" rollers 171 with the "former" die plates 165 attached to the upper surface of said charger table. The correct inner outline of the manufactured horseshoe is governed by the configuration of the frog 164, while the horseshoe is forged to its correct outer outline by the action of the rollers 170, which are permitted to have lateral movement under the pressure of springs 174.

In the bending and forging operation, hereinbefore described, the horseshoe is prevented from lifting clear of the frog 164 at its toe portion by the horizontally positioned roller 178.

When the charger table reaches the end of its inward stroke, the bottom die 163 thereon carrying the horseshoe around the frog 164 is in accurate register with the upper enclosing die 127 carried by the ram 113. The descent of this ram causes said upper die to exert considerable pressure on the horseshoe and form the required seating on its undersurface. In this action, the horseshoe is spread into the upper enclosing die and it is retained therein during the upward return stroke of the ram 113, until the ejector lever 125 contacts with the tappet rod 132 and forces downwardly the ejector plate 128 (housed in said upper die 127) thereby ejecting the horseshoe, which falls onto the hooked end 138 of the bell-crank lever 136. Upon the downward stroke of the ram 113, the lever 136 is so actuated as to discharge the horseshoe clear of the machine into a suitable receptacle for the final operation of nail-hole punching.

It will be understood that for the manufacture of horseshoes that are not required to be clipped at their toe portions, the spreading tool 67 and the bending tool 56 can be conveniently detached, and the fullering, bending, forging and finishing operations are performed continuously and automatically in correct sequential order as hereinbefore described.

What I claim is:—

1. In apparatus of the class specified, the combination with forging mechanism and a heating furnace, of a pedestal interposed between the furnace and forging mechanism, a frame mounted on said pedestal for adjustment toward and away from the furnace, a feed trough secured to said frame, grip rollers supported by said trough, a rotatable feed roller beneath said grip rollers, means for intermittently rotating said feed roller, a vertically reciprocating ram mounted in said frame carrying a shear blade, a second trough in alinement with and in spaced relation to the first trough, a shear blade fitted to said second trough, a spring actuated plate hingedly mounted on said second trough to constitute the bottom thereof, and a bearer bar extending transversely of said second trough in the rear of the bottom plate.

2. In apparatus of the class specified, the combination with the elements of claim 1 in which the second trough is fixedly supported by and in line with an opening in the frame of the forging mechanism, a discharge opening in the bottom of said trough, and a balance supporting roller rotatably mounted in an open space in said second trough intermediate the support of the plate and the connection of the trough with the frame of the forging mechanism for the purpose specified.

3. In apparatus of the class specified, the combination with forging mechanism, and a heating furnace, of means to deliver and sever predetermined portions of a heated bar from the furnace and feed the severed portions of the bar to the forging mechanism by the successive delivery movements of the bar from the furnace.

4. In apparatus of the class described, means for fullering a heated blank in the straight, and means for forming toe-clip on said blank simultaneously with the fullering operation.

5. In apparatus of the class specified, a fixed supporting table for a straight blank, a cross head reciprocable toward and away from the table, fullering tools and a spreading tool fitted to said cross head to act upon the blank on the table, a bending tool slidably mounted in said cross head, means for reciprocating said bending tool in the head in sequence with the operation of the fullering and spreading tool.

6. In apparatus of the class described, a forging machine having a main driving shaft, a fullering table mounted horizontally in said machine, a reciprocating cross-head, fullering tools and a spreading tool fitted to said cross-head, a guide in said cross-head, a slide in said guide, a bending tool fitted to said slide, a vise jaw on said cross-head, spring means actuating said vise jaw, means for adjusting said vise jaw, and means for reciprocating said cross-head and said vise jaw from said main driving shaft.

7. In apparatus of the class described, the combination with the elements of the claim 6 of a wearing plate on the fullering table, a locating plate adjustable on said wearing plate, an adjustable guide and locating stops supported by said fullering table.

8. In apparatus of the class described, a forging machine having a fullering table, a main driving shaft, guide brackets secured to said table, curved links supported by said brackets, a rocker shaft, a cam on said rocker shaft for transmitting motion from said main shaft to said rocker shaft, rods carried by and extending laterally from said shaft, a horizontal rod pivotally carried by and connecting the first-mentioned rods, and feed arms mounted on said horizontal rod and adapted to engage with fullered and clipped blanks and deliver the same down said brackets.

9. In apparatus of the class described, the combination with the elements set out in claim 8, of a push plate pivotally mounted on one of the guide brackets, and adjustable spring means actuating said push plate.

10. In apparatus of the class specified, means for simultaneously fullering and clipping heated straight metal blanks, a die reciprocable toward and away from the fullering and clipping means, means for delivering said blanks from the fullering and clipping means to said die, and bending and forging rollers arranged at opposite sides of the path of movement of the reciprocable die and operative to engage and bend a blank around the die during the movement thereof away from the fullering and clipping means.

11. In apparatus of the class specified, a fixed table to support a straight blank, a head reciprocable toward and away from the table carrying tools to fuller the blank and simultaneously spread the metal of the blank intermediate its ends and forming said spread material into a toe-clip, a die reciprocable toward and away from the fullering table, means to deliver a blank from the fullering table to said die, and forging rollers arranged at opposite sides of the path of said die adapted to bend the blank around the die during the movement thereof away from the fullering table.

12. In apparatus of the class specified, a fixed table to support a straight blank, a head reciprocable toward and away from the table carrying tools to fuller the blank and simultaneously spread the metal of the blank intermediate its ends and forming said spread material into a toe-clip, a die reciprocable toward and away from the fullering table, means to deliver a blank from the fullering table to said die, form plates arranged at opposite sides of the reciprocable die, slides mounted at opposite sides of the die to have movement toward and away from the die carrying rollers to engage with and guided by the form plates and forging rollers to engage and bend the blank about the die.

13. In apparatus of the class specified, a fixed table to support a straight blank, a head reciprocable toward and away from the table carrying tools to fuller the blank and simultaneously spread the metal of the blank intermediate its ends and forming said spread material into a toe-clip, a die reciprocable toward and away from the fullering table, means to deliver a blank from the fullering table to said die, forging rollers arranged at opposite sides of the path of said die adapted to bend the blank about the die during the movement thereof away from the fullering table, a finishing die movable toward and away from and co-operating with the forming die and arranged to move a bent blank from said latter die, and means to eject the finished shoe from the finishing die during the receding movement of said die.

14. In apparatus of the class specified, a fixed table to support a straight blank, a head reciprocable toward and away from the table carrying tools to fuller the blank and simultaneously spread the metal of the blank intermediate its ends and forming said spread material into a toe-clip, a die reciprocable toward and away from the fullering table, means to deliver a blank from the fullering table to said die, forging rollers arranged at opposite sides of the path of said die adapted to bend the blank about the die during the movement thereof away from the fullering table, and a finishing die movable toward and away from and co-operating with the forming die and arranged to move a bent blank from said latter die, means to eject the finished shoe from the finishing die during the receding movement of said die, a pivotally supported hooked lever to receive the shoe as it is ejected from the finishing die, said lever being operative by the finishing die during the successive movement thereof toward the forming die to deliver the shoe from said lever.

15. In apparatus of the class described, the combination with a horizontal slide table, a reciprocating charger table carrying a bottom die and a "frog" slidable on said table, a vertical reciprocating ram, an upper die carried by said ram, cams driven from the main driving shaft and operating said charger table, forging rollers and "former" rollers supported by the machine frame in the path of travel of said charger table, "former" die plates affixed to the charger table, means permitting lateral movement of said rollers against spring pressure, and ejector means in said upper die.

16. In apparatus of the class described, a reciprocating ram, an ejector block fitted to said reciprocating ram, a recess in said ejector block, an ejector lever pivotally supported in said recess, an enclosed upper die fitted to said ejector block, an ejector plate slidably mounted in said die, a pin fitted to said ejector plate adapted to be engaged by said ejector lever for ejecting the horseshoe from said enclosed upper die, and means for actuating said ejector lever.

17. In apparatus of the class described, the combination with a horizontally reciprocating charger table carrying a lower die and a raised "frog," a vertically reciprocating ram fitted with an upper enclosing die, means for actuating said charger table and said ram in synchronism, binding and forging rollers in the path of said charger table, "former" die plates affixed to said charger table, ejector mechanism carried by the ram, a bell-crank lever having a hook-shaped end and actuated by said ram, and a spring connected to said bell-crank lever and to a stationary part of the machine.

18. In apparatus of the class described, a reciprocating ram, a vertically adjustable sleeve fitted in said ram, means for locking said sleeve in adjusted position, a ram block bolted to said sleeve, an ejector block affixed to the ram block, a recess in the ejector block, an ejector lever pivotally secured to said ejector block and accommodated by said recess, an upper die fitted to said ejector block, a slidable ejector plate mounted in said die, a pin carried by said plate, and an adjustable tappet rod supported by the machine frame and adapted to contact with said ejector lever in the upward stroke of said ram.

19. In apparatus of the class specified, a table to support a straight blank, a head reciprocable toward and away from said table carrying tools to fuller and arrange said blank intermediate its ends with a lateral projecting clip, guide brackets extending laterally from said table, a forming die movable toward and away from said guide brackets and positioned relative to said brackets, and means operative during the receding movement of the reciprocable head to deliver a fullered and clipped blank from the table to the guide brackets and forming die.

20. In apparatus of the class specified, a table to support a straight blank, a head reciprocable toward and away from said table carrying tools to fuller and arrange said blank intermediate its ends with a lateral projecting clip, guide brackets extending laterally from said table, a forming die movable toward and away from said guide brackets and positioned relative to said brackets, and means operative during the receding movement of the reciprocable head to deliver a fullered and clipped blank from the table to the guide brackets and forming die, comprising a rocker frame, means operable by the movement of the reciprocable die to rock said frame, and arms pivotally carried by the frame normally resting upon the table and movable over the table and guide brackets.

21. In apparatus of the class specified, a reciprocable die, guide plates arranged at opposite sides of the die and movable therewith, slides mounted at opposite sides of the path of movement of the die to have movement transverse of the movement of the die, forming rollers carried by said slides to cooperate with the guide plates, bending rollers carried by the slides above the guide rollers to engage a blank upon the die and bend the same around the die, and a roller above the die to engage a bent blank thereon rearwardly of the bending rollers to prevent the bent blank from displacement on the die during the bending thereof.

In testimony whereof I affix my signature in presence of two witnesses.

JOHN HANBURY FARRER.

Witnesses:
M. STARPELD,
A. J. MALONEY.